(12) United States Patent
Kroeger et al.

(10) Patent No.: US 9,447,588 B2
(45) Date of Patent: Sep. 20, 2016

(54) FLOOR COVERING

(71) Applicant: NORA SYSTEMS GMBH, Weinheim (DE)

(72) Inventors: Mario Kroeger, Bruchsal (DE); Andreas Albrecht, Mannheim (DE); Dieter Riescher, Absteinach (DE); Stefan Mueller, Fuerth (DE)

(73) Assignee: NORA SYSTEMS GMBH, Weinheim (DE)

( * ) Notice: Subject to any disclaimer, the term of this patent is extended or adjusted under 35 U.S.C. 154(b) by 0 days.

(21) Appl. No.: 14/348,403

(22) PCT Filed: Sep. 21, 2012

(86) PCT No.: PCT/EP2012/003960
§ 371 (c)(1),
(2) Date: Mar. 28, 2014

(87) PCT Pub. No.: WO2013/045062
PCT Pub. Date: Apr. 4, 2013

(65) Prior Publication Data
US 2014/0242337 A1    Aug. 28, 2014

(30) Foreign Application Priority Data

Sep. 30, 2011 (DE) .................. 10 2011 114 597

(51) Int. Cl.
*E04F 15/16* (2006.01)
*E04F 15/10* (2006.01)
(Continued)

(52) U.S. Cl.
CPC ........... *E04F 15/16* (2013.01); *B29C 67/0081* (2013.01); *B29C 70/64* (2013.01); *E04F 15/10* (2013.01); *E04F 15/105* (2013.01); *E04F 15/163* (2013.01); *B29L 2031/732* (2013.01); *Y10T 428/24421* (2015.01)

(58) Field of Classification Search
CPC ......... B29C 67/245; B44C 5/06; B44F 9/04; E04F 13/002; Y10T 156/10; Y10T 428/24421
USPC .......................... 428/141–150; 427/180–206
See application file for complete search history.

(56) References Cited

U.S. PATENT DOCUMENTS 3,705,830 A * 12/1972 Gurgui et al. .................. 156/71
5,080,954 A    1/1992 Mackey, Sr. et al.
(Continued)

FOREIGN PATENT DOCUMENTS

CN      1203897     1/1999
DE      4025296     2/1991
(Continued)

OTHER PUBLICATIONS

International Search Report for PCT/EP2012/003960, English translation attached to original, Both completed by the European Patent Office on Jan. 17, 2013, All together 5 Pages.
(Continued)

*Primary Examiner* — Nathan Van Sell
(74) *Attorney, Agent, or Firm* — Sheridan Ross P.C.

(57) ABSTRACT

A floor covering having a web- or plate-shaped base material made from an elastomer material, wherein the base material is provided with mineral decorative particles, and wherein the density of the mineral decorative particles is not greater than 3 kg/dm3.

6 Claims, 4 Drawing Sheets

Figure 1:
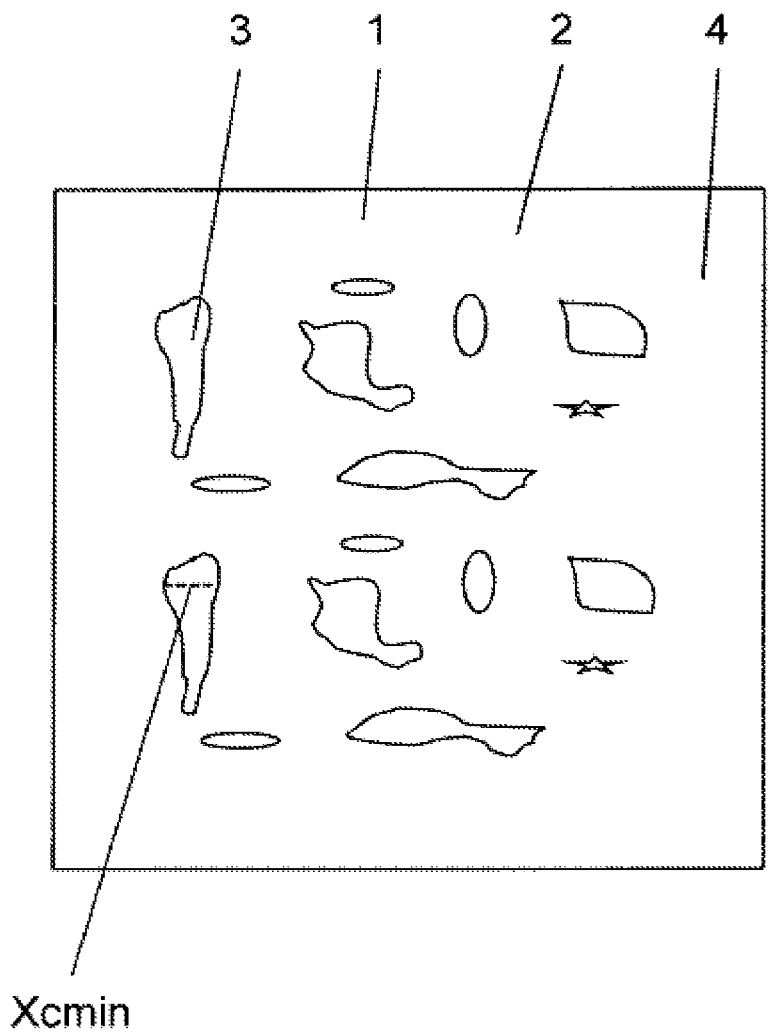

(51) Int. Cl.
  *B29C 70/64*   (2006.01)
  *B29C 67/00*   (2006.01)
  *B29L 31/00*   (2006.01)

(56) References Cited

U.S. PATENT DOCUMENTS

| | | |
|---|---|---|
| 5,200,253 A | 4/1993 | Yamaguchi et al. |
| 5,203,941 A | 4/1993 | Spain et al. |
| 6,555,216 B2 | 4/2003 | Chen et al. |
| 6,709,732 B1 | 3/2004 | Graab et al. |
| 7,306,688 B2 | 12/2007 | Kim et al. |
| 2007/0059543 A1* | 3/2007 | Kornfalt et al. .............. 428/502 |
| 2007/0261344 A1 | 11/2007 | Proulx et al. |
| 2008/0020179 A1 | 1/2008 | Graab et al. |
| 2009/0061159 A1 | 3/2009 | Staub et al. |
| 2009/0214827 A1* | 8/2009 | Howie, Jr. .................... 428/143 |
| 2015/0072111 A1 | 3/2015 | Rischer et al. |

FOREIGN PATENT DOCUMENTS

| | | |
|---|---|---|
| DE | 10316886 | 10/2004 |
| DE | 102005017169 | 10/2006 |
| EP | 1045084 | 10/2000 |
| EP | 1101606 | 5/2001 |
| EP | 1884607 | 2/2008 |
| JP | 2003-136555 | 5/2003 |

OTHER PUBLICATIONS

International Search Report for International Application No. PCT/EP2013/000814, mailed Jun. 24, 2013, 3 pages.
International Preliminary Report on Patentability and Written Opinion for International Patent Application No. PCT/EP2013/000814, mailed Oct. 2, 2014, 10 pages.
Official Action for U.S. Appl. No. 14/385,569, mailed Jun. 19, 2015 12 pages.

* cited by examiner

FLOOR COVERING

CROSS-REFERENCE TO RELATED APPLICATION

This application is the U.S. national phase of PCT Application No. PCT/EP2012/003960 filed on Sep. 21, 2012, which claims priority to German Patent Application No. 10 2011 114 597.8, filed on Sep. 30, 2011, the disclosures of which are incorporated in their entirety by reference herein.

The invention relates to a floorcovering comprising a base material which takes the form of a web or sheet and which is made of elastomeric material, where the base material has been provided with decorative mineral particles.

DE 103 16 886 A1 discloses a resilient floorcovering made of thermoplastic materials with corundum incorporated in the outer layer thereof to increase abrasion resistance. Corundum is a hard oxidic mineral which is in particular known for use as abrasive. The corundum is incorporated by first producing, from the material, a flat sheet that forms the floorcovering, and applying the corundum in the form of particles to the surface by scattering. In a posttreatment, the particles are bonded securely to the layer. For this purpose it is possible by way of example to introduce the layer into a calender.

However, it has been found during the production of floorcoverings that particulate corundum sinks into the matrix of the floorcovering, and therefore that only a small portion of the particles remains at the surface of the layer. Application of a large amount is therefore necessary in order to achieve an adequate surface effect with the particles.

The invention is based on the object of achieving further development of a floorcovering provided with decorative particles in such a way that an advantageous surface effect can be achieved when the amount applied is small.

Said object is achieved with the features of claim 1. The dependent claims refer to advantageous embodiments.

In order to achieve the object, the density of the decorative particles is smaller than 3 kg/dm³. Studies have shown that the sinking behavior of decorative particles depends in particular on the density of the particles. Although the location of decorative particles after application by scattering is initially on top of the base material even when their density is more than 3 kg/dm³, the decorative particles are pressed into the base material at the start of vulcanization, and the decorative particles are therefore primarily subject to hydrostatic pressure. It has been found here that decorative particles of density more than 3 kg/dm³ sink into the matrix of the base material in such a way that, during vulcanization, the base material flows over the decorative particles and covers these to some extent or even completely. The corundum particles known from the prior art have a high density, 3.9 kg/dm³, which is about 2 to 2.5 times greater than the density of the elastomeric base material. Although decorative particles of density less than 3 kg/dm³ are also pressed entirely into the base material, these do not then sink into the base material, and they are not covered by the base material, or at most are covered to a small extent. Surprisingly, it has been found that the manner of embedment of the decorative particles of density less than 3 kg/dm³ into the base material is such that the projection of the particles, or the exterior outlines of the decorative particles, is/are discernible on viewing from above, and that although the decorative particles have been bonded by virtue of their shape into the base material, the region of the decorative particles that is discernible on viewing from above is almost entirely free from base material.

Furthermore, although corundum particles have an angled structured surface, they have high sphericity in the vicinity of 1. When these decorative particles are applied by scattering onto a plastically deformable layer, for example an unfinished floorcovering, the high density and round shape of the decorative particles causes them to sink into the matrix of the layer. This effect becomes amplified in particular during the initiation of vulcanization, because of a short-term decrease in the viscosity of the elastomeric material. In contrast, decorative particles of low density and of low sphericity sink into the matrix of the base material to a smaller extent, and are also not covered by the base material, and a larger portion of the decorative particles therefore remains at the surface of the base material, where it exerts an optical and mechanical effect. In the invention, it has now been found that for the decorative mineral particles of a particle fraction with particle width ($x_{c\ min}$) from 0.35 mm to 1.4 mm in a cumulative $Q_3$ distribution a sufficient condition for the achievement of a surface effect resulting from the decorative particles is simply an $X_{50}$ sphericity of not more than 0.65. The sphericity, also termed roundness, of a decorative particle is defined via the ratio between the area enclosed by a decorative particle and the circumference thereof. This value, starting from 1, becomes smaller as the sphericity or roundness of a decorative particle deviates to a greater extent from the shape of a sphere, the body of ideal roundness. The smaller the sphericity, the smaller the penetration depth of the decorative particles scattered onto the layer. The sphericity and the particle size are preferably determined by optical measurement methods. The particle size is determined by optical recording of the projection area of individual particles and optical determination of the smallest width $x_{c\ min}$ thereof. The sphericity of the individual particles is recorded optically at the same time.

The decorative particles are of mineral origin, and the decorative particles here preferably comprise granite particles and/or mica. In the context of an elastomeric base material, mineral particles can give an interesting color effect and an effective surface structure. Decorative mineral particles moreover have a favorable effect on the coefficient of friction of the floorcovering. In particular, decorative mineral particles improve the antislip properties of an elastomeric floorcovering.

Granite particles and mica particles moreover have the advantage of being comparatively soft in particular in comparison with corundum particles. It is therefore possible to use conventional cutting machines to cut the floorcovering provided with particles in the invention. In this connection, a Moh hardness of less than 7 of the mineral particles has been found to be particularly advantageous.

In one advantageous embodiment, the coverage with decorative particles on the surface of the floorcovering is greater than 2%, preferably greater than 5%. Coverage of 2% means that decorative particles of the type of the invention cover 2% of the floorcovering surface that faces toward open space. The decorative particles have been found to have a significant optical and mechanical surface effect when coverage is at least 2%. Coverage is determined by optical image analysis, by first scanning the surface of the floorcovering or taking a digital photograph of said surface, and then using software to analyze the surface thus recorded.

The average particle width of the decorative particle fraction applied to the surface of the floorcovering can be at most 2 mm, preferably at most 1.5 mm. It is particularly preferable to use a fraction of decorative particles with a particle diameter from 0.1 mm to 2 mm. Decorative particles of different size are thus applied to the base material, giving a particularly advantageous optical effect and particularly advantageous mechanical properties of the floorcovering. The optical effect is further increased by using a mixed decorative particle fraction composed of granite particles and of mica particles.

The base material is preferably composed of a rubber comprising butadiene monomers. Nitrile-butadiene rubber (NBR), styrene-butadiene rubber (SBR), and natural rubber (NR) have proven particularly successful in the production of floorcoverings. However, it is also possible to produce the base material from ethylene-propylene-diene rubber (EPDM), butadiene rubber (BR), or isoprene rubber (IR), or from a mixture of the abovementioned materials. In particular, a floorcovering produced with the decorative particles of the invention has advantageous optical and mechanical properties.

In relation to durable bonding of the decorative mineral particles into the material, it has been found to be advantageous for the Mooney viscosity of the unvulcanized base material to be from 60 to 160 ML (1+4/100° C.), preferably from 100 to 140 ML (1+4/100° C.). Mooney viscosity is determined in accordance with DIN 53523. "(1+4/100° C.)" means that the viscosity is measured with a standard rotor in accordance with DIN 53523, a preheating time of one minute, and with a test time of four minutes, with a test temperature of 100° C. in the test chamber.

The floorcovering has a long service time together with good layability when the hardness of the vulcanized base material is from 75 to 96 Shore A, preferably from 85 to 96 Shore A, and the elongation at break of the vulcanized base material is from 30% to 750%, preferably from 50% to 150%. It has been found here that the bonding of the mineral particles into the matrix of the base material is secure even at high elongation.

In the process of the invention for the production of a floorcovering as described above, the elastomeric base material is first provided and converted to the form of a sheet, decorative mineral particles with sphericity smaller than or equal to 0.65 are then applied by scattering to the surface of the base material, and, for vulcanization, the base material provided with the decorative particles is introduced into vulcanization equipment. Surprisingly, it has been found here that although the application of the decorative particles to the base material is followed by a combination of heat- and pressure-treatment, and although the decorative mineral particles of density less than 3 kg/dm$^3$ are pressed into the matrix of the base material during vulcanization, they are at most covered to a small extent by the base material, and they therefore exert both a mechanical and an optical effect on the base material. In particular in connection with the abovementioned elastomeric materials, this is surprising to the extent that, during initiation of vulcanization, during heating immediately prior to crosslinking said materials are converted at least for a short time to a low-viscosity phase. It would therefore have been expected that even decorative mineral particles of low density would sink into the matrix of the base material during vulcanization.

In one preferred process, the vulcanization takes place in a continuous process. In continuous vulcanization, the base material in the form of a web is introduced into a web-vulcanization system which has a heatable roll with, passing around the roll, a tensionable steel belt. The base material is introduced between steel belt and roll into the web-vulcanization system, where it is vulcanized during passage around the roll. The steel belt here presses the base material onto the roll and compresses it, and the mineral particles are also pressed into the base material here. The mineral particles are applied to the surface of the base material by scattering immediately prior to vulcanization.

Prior to and during the scattering process it is advantageous to carry out electrostatic discharge of the decorative mineral particles. For this, the decorative mineral particles can be passed over equipment for electrostatic discharge, for example discharge bars, and/or the base material is in contact with equipment of this type. The decorative mineral particles have comparatively small size and mass, and electrostatic effects are therefore powerful, and can cause attraction or repulsion between particles. This can in turn lead to undesired nonuniform particle distribution. If the decorative mineral particles are electrostatically discharged, a more uniform distribution of the decorative particles is obtained on the surface of the floorcovering.

Vulcanization can be followed by cutting-to-size of the base material. The base material in the form of a web can thus be converted to the form of a sheet or can be cut to size laterally. In the light of this, it is advantageous to use decorative mineral particles with low Moh hardness of less than 7, for example granite particles or mica particles, since these can be cut by conventional cutting machines. Hard particles, for example made of corundum or silicon carbide, lead to premature wear of the cutting blades, caused by the hardness.

Figure 2:
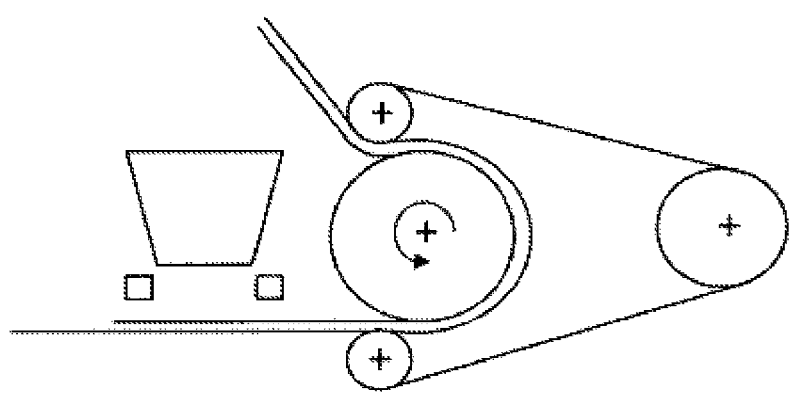
Figure 3:
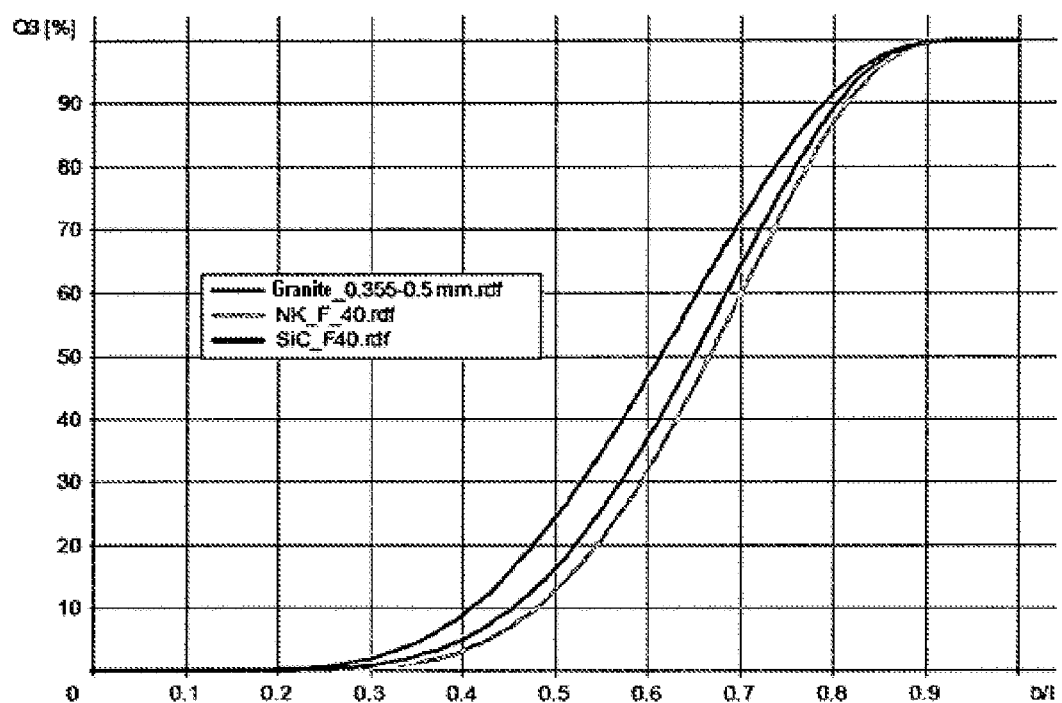
Figure 4:
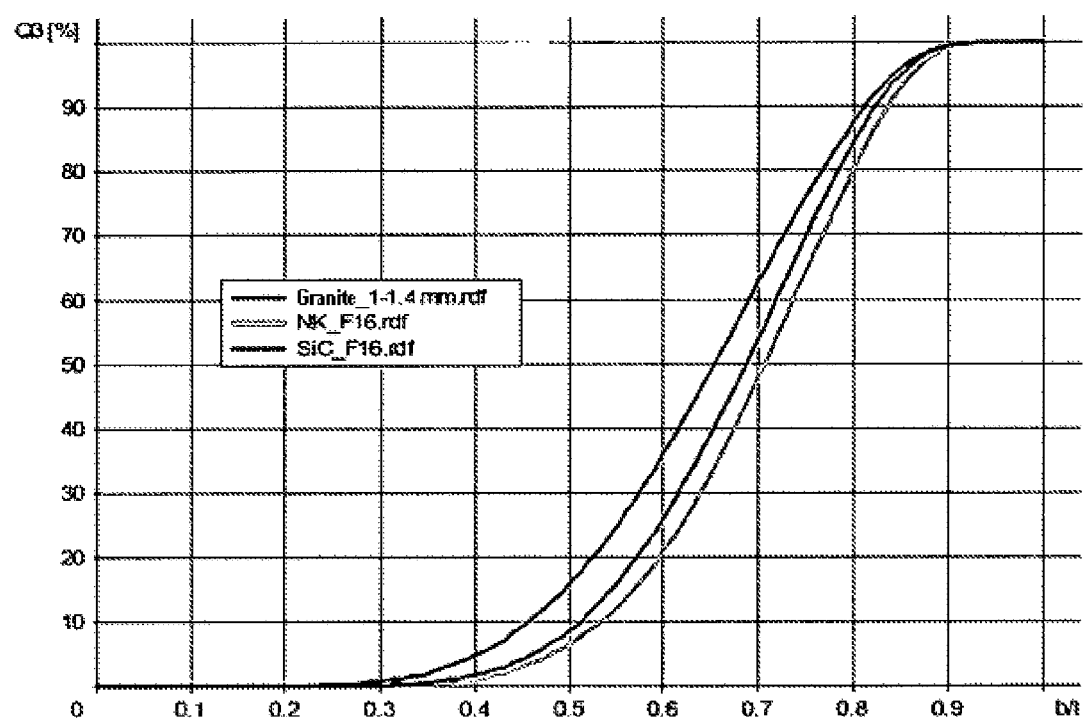

Some embodiments of the floorcovering of the invention are explained in more detail below. The figures provide the following diagrams:

in FIG. 1, the floorcovering viewed from above;
in FIG. 2, the process for producing the floorcovering;
in FIG. 3, a first cumulative curve showing the particle distribution;
in FIG. 4, another cumulative curve showing another particle distribution.

FIG. 1 shows a floorcovering 1 comprising a base material 2 which takes the form of a sheet made of elastomeric material. In this embodiment, the base material includes SBR. The base material 2 has been provided with decorative mineral particles 3 made of granite and mica. The shape of the decorative particles 3 here is such that the statistical distribution of roundness for the particle size fraction stated below exhibits an $x_{50}$ sphericity of 0.65 in a cumulative $Q_3$ distribution. The decorative particles 3 of a particle fraction applied to the floorcovering are composed of granite and mica, and are visible on the surface 4 of the floorcovering 1, and have an average width of from 0.1 mm to 2 mm. The width of a particle is determined optically, by recording the projection of a particle and determining its smallest width. This smallest width $x_{c\ min}$ is utilized for particle width classification. The amount applied of the decorative particles 3 has been selected in such a way that the coverage of the surface 4 of the floorcovering 1 with decorative particles 3 is greater than 2%, preferably greater than 5%. In this embodiment, the coverage is in the region of 2.4%. The crude material (SBR) forming the base material has a Mooney viscosity of 120 ML (1+4/100° C.). The base material (SBR) has a hardness in the range from 90 to 95 Shore A and an elongation at break in the range from 100% to 150%. It has been found here that the bonding of the decorative particles into the matrix of the base material is secure even on exposure to high mechanical stress.

FIG. 2 shows an apparatus for the production of a floorcovering. Here, the raw material of the base material 2 is first provided, and is then converted to the form of a web. For this, the raw material, for example the raw material of the SBR, is mixed in a kneader, and the resultant raw composition is introduced into a calender, the arrangement of rolls of which rolls the raw material into the form of a web. Included air bubbles are also expelled from the raw material during calendering. This material provided in the form of a web forming the base material 2 is introduced into equipment for continuous vulcanization, i.e. for the crosslinking of the elastomeric material. The equipment can be designed for continuous or batchwise vulcanization, but this figure shows continuous vulcanization in equipment designed as web-vulcanization system.

Prior to introduction into the vulcanization process, the abovementioned decorative mineral particles are applied by scattering to the base material, and for purposes of electrostatic discharge the mineral particles here are passed over a discharge bar.

For continuous vulcanization, the web-vulcanization system comprises a heatable roll with a tensionable steel belt passed around a portion of its circumference. The steel belt passes over rollers, and circulates with the heatable roll. The base material 2 is introduced into the gap between steel belt and roll for vulcanization, is passed continuously around the roll, and is then removed. The set-up of the web-vulcanization system is such that the base material 2 remains in the system for five minutes, the vulcanization temperature here being 180° C. The vulcanization crosslinks the material, and elastomeric properties are thus generated. Directly after the introduction of the base material 2 into the gap between roll and steel belt, the decorative particles are pressed into the base material, and the manner in which the particles are pressed into the base material here is such that the projection of the decorative particles, and therefore the exterior shapes of these, remain(s) discernible at the surface 4 of the floorcovering 1. The onset of vulcanization bonds the decorative particles into the base material by virtue of their shape and by coherent bonding.

After vulcanization and after cooling, the base material 2 is cut to size to give sheets.

Automated image analysis is preferably used both to determine sphericity and to determine average particle width. For the measurement process, the loose particles are applied to a backlit plate. The particles block the light, and are recorded by a CCD camera. The images recorded by the CCD camera are then passed to an automated evaluation system. Roundness describes the ratio between the area enclosed by a particle image and the circumference of the particle image. The roundness of a spherical particle is 1, but as deviation from the round shape increases the value approaches zero. The roundness of a particle is represented by the following formula, where A is the projection area of the decorative particle and U is its circumference:

$$R = \frac{4\pi A}{U^2}$$

Optical evaluation is used likewise and simultaneously to measure the smallest width of the decorative particles 3. It is preferable here to use the smallest particle diameter $x_{c\ min}$ for each decorative particle 3, since decorative particles 3 also pass through a sieve of width corresponding to the smallest particle width. Decorative particles with a prescribed particle width range are collated, and sphericity is plotted on a cumulative $Q_3$ curve. The cumulative curve shows the standardized quantity of all decorative particles with sphericity smaller than 1. In a cumulative $Q_3$ curve (r=3) the decorative particles are sorted with respect to the sphericity calculated from the volume and surface shape thereof.

FIG. 3 presents a first cumulative $Q_3$ curve, on which decorative particles of various materials with a particle size range (smallest width $x_{c\ min}$) of 0.355 mm and 0.5 mm are plotted. Decorative particles 3 composed of granite, silicon carbide, and corundum are compared, and the arrangement here has the cumulative curve relating to the granite particles on the left-hand side, closest to the ordinate. The cumulative curve in the middle is the cumulative curve relating to the silicon carbide particles, and the right-hand cumulative curve is the cumulative curve relating to the corundum particles. The claimed $x_{50}$ value indicates that the sphericity of 50% of the granite particles in the size range plotted is 0.65 or smaller. Particles made of silicon carbide, and also those made of corundum, have a higher $x_{50}$ value.

The following sphericity values of the invention can by way of example be taken from FIG. 3:

| Distribution | Granite | Corundum |
|---|---|---|
| $X_{70}$ | 0.7 | 0.74 |
| $X_{60}$ | 0.65 | 0.7 |
| $X_{50}$ | 0.62 | 0.66 |
| $X_{40}$ | 0.58 | 0.63 |
| $X_{30}$ | 0.53 | 0.6 |

FIG. 4 shows another comparable cumulative $Q_3$ curve, and in this cumulative curve particles in a size range (smallest width $x_{c\ min}$) of from 1 mm to 1.4 mm are plotted. The arrangement of the cumulative curves for the individual materials corresponds to the cumulative curve described above.

The following sphericity values of the invention can by way of example be taken from FIG. 4:

| Distribution | Granite | Corundum |
|---|---|---|
| $X_{70}$ | 0.73 | 0.77 |
| $X_{60}$ | 0.69 | 0.75 |
| $X_{50}$ | 0.65 | 0.71 |
| $X_{40}$ | 0.62 | 0.68 |
| $X_{30}$ | 0.58 | 0.65 |

As stated above, it is also possible to determine the average particle width by sieve analysis in accordance with DIN 66165.

The sphericity and the average diameter of the particles of the invention were measured here with a "Camsizer" particle-measurement device from Retsch Technologie GmbH in Haan.

The table below lists mechanical properties of the granite particles and mica particles of the invention and, for comparison, mechanical properties of corundum particles and silicon carbide particles:

| Material | Moh hardness | Density |
|---|---|---|
| Mica | from 2 to 3 | 2.76 kg/dm$^3$ |
| Granite | 6 | 2.76 kg/dm$^3$ |
| Silicon carbide | 9.6 | 3.22 kg/dm$^3$ |
| Corundum | 9 | 3.90 kg/dm$^3$ |

What is claimed is:

1. A floorcovering comprising:
a base layer, wherein a form of the base layer is a web or sheet, wherein the base layer comprises a top surface, wherein a material of the base layer is an elastomer, and wherein the base layer is formed as a single layer; and
decorative mineral particles dispersed within the top surface of the base layer, wherein the density of the decorative mineral particles is not greater than 3 kg/dm$^3$, and wherein in a cumulative $Q_3$ distribution the $X_{50}$ sphericity of the decorative mineral particles of a particle fraction with particle width ($X_{c\,min}$) from 0.35 mm to 1.4 mm is smaller than or equal to 0.65, wherein the decorative mineral particles of less than 3 kg/dm$^3$ are pressed entirely into the base material, and wherein an exterior portion of at least some of the decorative mineral particles is not covered by the base material and an outline of the at least some decorative mineral particles is discernible on the floorcovering when viewing a top surface of the floorcovering from above.

2. The floorcovering as claimed in claim 1, wherein the Moh hardness of the decorative mineral particles is smaller than 7.

3. The floorcovering as claimed in claim 1, wherein the decorative mineral particles comprise granite particles and/or mica.

4. The floorcovering as claimed in claim 1, wherein the coverage of the surface of the floorcovering with decorative mineral particles is greater than 2%, preferably greater than 5%.

5. The floorcovering as claimed in claim 1, wherein the average diameter of the decorative mineral particles of a particle fraction applied to the floorcovering is smaller than or equal to 2 mm, preferably smaller than or equal to 1.5 mm.

6. The floorcovering as claimed in claim 1, wherein the base material comprises a rubber comprising butadiene monomers.

* * * * *